United States Patent
Tsujino et al.

(10) Patent No.: US 8,471,953 B2
(45) Date of Patent: Jun. 25, 2013

(54) ELECTRONIC CAMERA THAT ADJUSTS THE DISTANCE FROM AN OPTICAL LENS TO AN IMAGING SURFACE

(75) Inventors: Kazuhiro Tsujino, Osaka (JP); Daisuke Mizuguchi, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/466,454

(22) Filed: May 8, 2012

(65) Prior Publication Data

US 2012/0218459 A1 Aug. 30, 2012

Related U.S. Application Data

(62) Division of application No. 12/198,319, filed on Aug. 26, 2008, now Pat. No. 8,237,850.

(30) Foreign Application Priority Data

Aug. 27, 2007 (JP) ................................. 2007-219874
Aug. 27, 2007 (JP) ................................. 2007-220121

(51) Int. Cl.
G03B 13/00 (2006.01)
G03B 17/00 (2006.01)
G03B 3/00 (2006.01)
H04N 5/232 (2006.01)
H04N 5/235 (2006.01)
H04N 9/73 (2006.01)

(52) U.S. Cl.
USPC ........ 348/353; 348/349; 348/345; 348/222.1; 348/225.1; 396/79; 396/102; 396/104

(58) Field of Classification Search
USPC ............... 348/345–357; 382/256; 396/79–82, 396/102–104
See application file for complete search history.

(56) References Cited

U.S. PATENT DOCUMENTS 4,931,820 A * 6/1990 Matsuzawa et al. ............ 396/93
4,931,821 A * 6/1990 Hamada et al. ............... 396/102
(Continued)

FOREIGN PATENT DOCUMENTS

JP 63-151180 A 6/1988
JP 08-321985 A 12/1996
(Continued)

OTHER PUBLICATIONS

Japanese Office Action dated Apr. 18, 2011, issued in corresponding Japanese Patent Application No. 2007-219874.
(Continued)

Primary Examiner — Lin Ye
Assistant Examiner — Chia-Wei A Chen
(74) Attorney, Agent, or Firm — Westerman, Hattori, Daniels & Adrian, LLP

(57) ABSTRACT

An electronic camera includes an image sensor. The image sensor has an imaging surface irradiated with an optical image of an object scene through a focus lens and repeatedly generates an object scene image. A CPU executes an AF process for adjusting a distance from the focus lens to the imaging surface to a distance corresponding to a focal point, based on the object scene image generated by the image sensor. However, the CPU has a high-luminance excluding function for excluding from a target to be noticed of the AF process a partial image having a luminance exceeding "TH1" out of the object scene image generated by the image sensor. The CPU determines whether or not a partial image having a luminance exceeding "TH2" larger than "TH1" exists on the object scene image generated by the image sensor, and turns on the high-luminance excluding function when a determination result is affirmative and turns off the high-luminance excluding function when the determination result is negative.

13 Claims, 12 Drawing Sheets

U.S. PATENT DOCUMENTS

| | | | |
|---|---|---|---|
| 5,003,339 A | 3/1991 | Kikuchi et al. | |
| 6,094,223 A * | 7/2000 | Kobayashi | 348/354 |
| 6,636,262 B1 | 10/2003 | Okajima et al. | |
| 7,053,953 B2 * | 5/2006 | Belz et al. | 348/346 |
| 7,262,804 B2 * | 8/2007 | Watanabe | 348/349 |
| 7,405,762 B2 * | 7/2008 | Nonaka et al. | 348/348 |
| 7,505,678 B2 | 3/2009 | Suto et al. | |
| 7,551,209 B2 | 6/2009 | Miyao et al. | |
| 7,711,260 B2 * | 5/2010 | Ide et al. | 396/91 |
| 7,725,018 B2 * | 5/2010 | Konishi | 396/102 |
| 7,834,915 B2 | 11/2010 | Wakazono et al. | |
| 7,864,239 B2 * | 1/2011 | Ikeda | 348/345 |
| 2001/0000674 A1 | 5/2001 | Yasuda | |
| 2001/0013895 A1 * | 8/2001 | Aizawa et al. | 348/222 |
| 2001/0028402 A1 | 10/2001 | Sugimoto et al. | |
| 2002/0109784 A1 * | 8/2002 | Suda et al. | 348/345 |
| 2002/0154241 A1 * | 10/2002 | Ohkawara | 348/345 |
| 2002/0197071 A1 * | 12/2002 | Hofer | 396/155 |
| 2003/0122956 A1 | 7/2003 | Sugimoto et al. | |
| 2004/0183939 A1 | 9/2004 | Nonaka et al. | |
| 2004/0208385 A1 * | 10/2004 | Jiang | 382/254 |
| 2004/0209237 A1 * | 10/2004 | Flewelling et al. | 435/4 |
| 2006/0061676 A1 * | 3/2006 | Suda | 348/345 |
| 2006/0152619 A1 | 7/2006 | Takei | |
| 2006/0262211 A1 | 11/2006 | Kido | |
| 2007/0003151 A1 * | 1/2007 | Kawahara | 382/239 |
| 2007/0269105 A1 | 11/2007 | Zhang et al. | |
| 2008/0018776 A1 * | 1/2008 | Park et al. | 348/349 |
| 2008/0025716 A1 | 1/2008 | Yost et al. | |
| 2008/0031611 A1 * | 2/2008 | Konishi | 396/102 |
| 2008/0069440 A1 | 3/2008 | Forutanpour | |
| 2008/0226278 A1 * | 9/2008 | Garg et al. | 396/123 |
| 2008/0273869 A1 * | 11/2008 | Lukyanov | 396/125 |
| 2009/0207299 A1 * | 8/2009 | Hori | 348/349 |
| 2010/0097476 A1 * | 4/2010 | Marks | 348/169 |
| 2010/0188559 A1 * | 7/2010 | Ortyn et al. | 348/348 |

FOREIGN PATENT DOCUMENTS

| | | |
|---|---|---|
| JP | 2001-013401 A | 1/2001 |
| JP | 2001-255450 A | 9/2001 |
| JP | 2002-182106 A | 6/2002 |
| JP | 2005-055746 A | 3/2005 |
| JP | 2007-072095 A1 | 3/2007 |

OTHER PUBLICATIONS

Japanese Office Action dated Apr. 18, 2011, issued in corresponding Japanese Patent Application No. 2007-220121.

* cited by examiner (A)

(B)

(C)

(A)

(B)

ELECTRONIC CAMERA THAT ADJUSTS THE DISTANCE FROM AN OPTICAL LENS TO AN IMAGING SURFACE

CROSS REFERENCE OF RELATED APPLICATION

This application is a divisional application of U.S. Ser. No. 12/198,319, filed Aug. 26, 2008, and is based upon and claims the benefit of priority from the prior Japanese Patent Application Application Nos. 2007-219874 and 2007-220121, which were filed on Aug. 27, 2007, the entire contents of which are incorporated herein by reference.

BACKGROUND OF THE INVENTION

1. Field of the Invention

The present invention relates to an electronic camera. More specifically, the present invention relates to an electronic camera that references an object scene image generated on an imaging surface to adjust a distance from an optical lens to the imaging surface.

2. Description of the Related Art

According to one example of this type of camera, a plurality of focus evaluation values respectively corresponding to a plurality of blocks on an imaging surface are obtained by each lens position. Focusing control is executed based on a focus evaluation value, out of the plurality of focus evaluation values thus obtained, corresponding to a block different from a block to which a low-contrast image or a high-luminance image belongs. Thereby, it becomes possible to avoid a situation where the focusing control fails when capturing an object, such as a light source, of which the focus evaluation value increases as a degree of focus decreases.

However, among high-luminance objects, there exists an object of which the focus evaluation value does not increase irrespective of the decrease in degree of focus (a white board, a white-colored pillar, for example). In the above-described camera, an image of such an object is excluded from a target of the focusing control. Thereby, it becomes probable that a focus adjusting operation becomes unstable.

Also, when a reference value for determining whether or not a block is a block to which the high-luminance image belongs is set low, even the block to which an image required for the focusing control belongs is excluded. As a result, the focusing control may be impossible. In contrary, when the above-described reference value is set high, it is not possible to exclude a block to which a high-luminance blurred image on a periphery of the light source belongs, and thus, there is a probability that the focusing control fails.

SUMMARY OF THE INVENTION

An electronic camera according to the present invention comprises: an imager, having an imaging surface irradiated with an optical image of an object scene through an optical lens, for repeatedly generating an object scene image; an adjustor for adjusting a distance from the optical lens to the imaging surface to a distance corresponding to a focal point, based on the object scene image generated by the imager; an excluder for excluding from a target to be noticed of the adjustor a first portion image having a luminance exceeding a first threshold value, out of the object scene image generated by the imager; and a controller for determining whether or not a second portion image having a luminance exceeding a second threshold value larger than the first threshold value exists on the object scene image generated by the imager so as to start the excluder when a determination result is affirmative while stop the excluder when the determination result is negative.

Preferably, the determiner renders the determination result affirmative when a ratio of a pixel having a luminance exceeding the second threshold value to the first portion image exceeds a reference.

Preferably, a pixel detector for detecting a specific pixel having a luminance exceeding the second threshold value from the object scene image generated by the imager is further provided, in which the determiner executes a determining process based on the number of specific pixels detected by the pixel detector. Further preferably, the pixel detector detects the specific pixel from within the first portion image.

Preferably, a decreasor for decreasing the first threshold value according to an increase of the second portion image is further provided.

Preferably, an integrator for integrating a high-frequency component of the object scene image generated by the imager is further provided, in which the adjustor includes an adjustment executor for executing an adjusting process by referencing an integral result of the integrator, and the excluder prohibits the integral process of the integrator corresponding to the first portion image.

Further preferably, the integrator individually integrates a plurality of high-frequency components respectively corresponding to a plurality of areas allocated on the imaging surface, and the adjustor further includes a designator for sequentially designating each of the plurality of areas as an area to be noticed, and a modifier for modifying the integral result of the integrator corresponding to the area to be noticed to a lower value, as a brightness of a partial image belonging to one or more areas including the area to be noticed is higher.

More preferably, the modifier includes a first modification processor for executing a first modification process according to a first arithmetic expression when a brightness of a partial image belonging to the area to be noticed exceeds a third threshold value, and a second modifier for executing a second modification process according to a second arithmetic expression when a brightness of a partial image belonging to an adjacent area adjacent to the area to be noticed exceeds a fourth threshold value.

In a certain aspect, the first modification process and the second modification process are selectively executed, and the first modification process takes precedence to the second modification process.

In another aspect, the first arithmetic expression includes a process for subtracting a numerical value indicating the integral result of the area to be noticed by a normalization value of a numerical value indicating the brightness of the area to be noticed, and the second arithmetic expression includes a process for subtracting the numerical value indicating the integral result of the area to be noticed by a normalization value of a difference between the numeral value indicating the brightness of the area to be noticed and a numerical value indicating a brightness of the adjacent area.

An imaging control program product according to the present invention is an imaging control program product executed by a processor of an electronic camera comprising an imager, having an imaging surface irradiated with an optical image of an object scene through an optical lens, for repeatedly generating an object scene image. The imaging control program product comprises: an adjusting step of adjusting a distance from the optical lens to the imaging surface to a distance corresponding to a focal point, based on the object scene image generated by the imager; an excluding step of excluding a first portion image having a luminance exceeding a first threshold value from a target to be noticed of the adjustor, out of the object scene image generated by the imager; and a controlling step of determining whether or not a second portion image having a luminance exceeding a second threshold value larger than the first threshold value exists on the object scene image generated by the imager so as to start the excluding step when a determination result is affirmative while stop the excluding step when the determination result is negative.

An imaging control method according to the present invention is an imaging control method executed by an electronic camera comprising an imager, having an imaging surface irradiated with an optical image of an object scene through an optical lens, for repeatedly generating an object scene image. The imaging control method comprises: an adjusting step of adjusting a distance from the optical lens to the imaging surface to a distance corresponding to a focal point, based on the object scene image generated by the imager; an excluding step of excluding a first portion image having a luminance exceeding a first threshold value from a target to be noticed of the adjustor, out of the object scene image generated by the imager; and a controlling step of determining whether or not a second portion image having a luminance exceeding a second threshold value larger than the first threshold value exists on the object scene image generated by the imager so as to start the excluding step when a determination result is affirmative while stop the excluding step when the determination result is negative.

An electronic camera according to the present invention comprises: an imager, having an imaging surface irradiated with an optical image of an object scene through an optical lens, for repeatedly generating an object scene image; an allocator for allocating a plurality of areas on the object scene captured by the imaging surface; a detector for detecting a degree of focus of a partial image belonging to each of the plurality of areas allocated by the allocator, out of the object scene image generated by the imager; a designator for sequentially designating each of the plurality of areas allocated by the allocator as an area to be noticed; a modifier for modifying the degree of focus detected by the detector corresponding to the area to be noticed to a lower value, as a brightness of the partial image belonging to one or more areas including the area to be noticed is higher; and an adjustor for adjusting a distance from the optical lens to the imaging surface to a distance corresponding to a focal point by referencing the degree of focus modified by the modifier.

Preferably, the modifier includes a first modifier for executing a first modification process according to a first arithmetic expression when a brightness of a partial image belonging to the area to be noticed exceeds a first threshold value, and a second modifier for executing a second modification process according to a second arithmetic expression when a brightness of a partial image belonging to an adjacent area adjacent to the area to be noticed exceeds a second threshold value.

Further preferably, the first modification process and the second modification process are selectively executed, and the first modification process takes precedence to the second modification process.

More preferably, the first arithmetic expression includes a process for subtracting a numerical value indicating the degree of focus of the area to be noticed by a normalization value of a numerical value indicating a brightness of the area to be noticed, and the second arithmetic expression includes a process for subtracting a numerical value indicating the degree of focus of the area to be noticed by a normalization value of a difference between the numeral value indicating the brightness of the area to be noticed and a numerical value indicating a brightness of the adjacent area.

Preferably, an excluder for excluding a first portion image having a luminance exceeding a third threshold value from a target to be noticed of the detector, out of the object scene image generated by the imager, is further provided.

Further preferably, a controller for determining whether or not a second portion image having a luminance exceeding a fourth threshold value larger than the third threshold value exists on the object scene image generated by the imager so as to start the excluder when a determination result is affirmative while stop the excluder when the determination result is negative, is further provided.

More preferably, the determiner renders the determination result affirmative when a ratio of a pixel having a luminance exceeding the fourth threshold value to the first portion image exceeds a reference.

In a certain aspect, a pixel detector for detecting, from the object scene image generated by the imager, a specific pixel having a luminance exceeding the fourth threshold value is further provided, in which the determiner executes a determining process based on the number of specific pixels detected by the pixel detector. In another aspect, the pixel detector detects the specific pixel out of the first portion image.

Preferably, a decreasor for decreasing the third threshold value according to an increase of the second portion image is further provided. The image excluded from the target to be noticed of the detector increases according to an increase of the second portion image.

Further preferably, the detector integrates a high-frequency component of the partial image belonging to each of the plurality of areas to obtain the degree of focus, and the excluder prohibits an integral process of the detector corresponding to the first portion image.

An imaging control program product according to the present invention is an imaging control program product, executed by a processor of an electronic camera comprising: an imager, having an imaging surface irradiated with an optical image of an object scene through an optical lens, for repeatedly generating an object scene image; an allocator for allocating a plurality of areas on the object scene captured by the imaging surface; and a detector for detecting a degree of focus of a partial image belonging to each of the plurality of areas allocated by the allocator, out of the object scene image generated by the imager. The imaging control program product comprises: a designating step of sequentially designating each of the plurality of areas allocated by the allocator as an area to be noticed; a modifying step of modifying the degree of focus detected by the detecting step corresponding to the area to be noticed to a lower value, as a brightness of the partial image belonging to one or more areas including the area to be noticed is higher; and an adjusting step of adjusting a distance from the optical lens to the imaging surface to a distance corresponding to a focal point, with reference to the degree of focus modified by the modifying step.

An imaging control method according to the present invention is an imaging control method executed by an electronic camera comprising: an imager, having an imaging surface irradiated with an optical image of an object scene through an optical lens, for repeatedly generating an object scene image; an allocator for allocating a plurality of areas on the object scene captured by the imaging surface; and a detector for detecting a degree of focus of a partial image belonging to each of the plurality of areas allocated by the allocator, out of the object scene image generated by the imager. The imaging control method comprises: a designating step of sequentially designating each of the plurality of areas allocated by the allocator as an area to be noticed; a modifying step of modifying the degree of focus detected by the detecting step corresponding to the area to be noticed to a lower value, as a brightness of the partial image belonging to one or more areas including the area to be noticed is higher; and an adjusting step of adjusting a distance from the optical lens to the imaging surface to a distance corresponding to a focal point, with reference to the degree of focus modified by the modifying step.

The above described features and advantages of the present invention will become more apparent from the following detailed description of the present invention when taken in conjunction with the accompanying drawings.

DETAILED DESCRIPTION OF THE PREFERRED EMBODIMENTS

Figure 1:
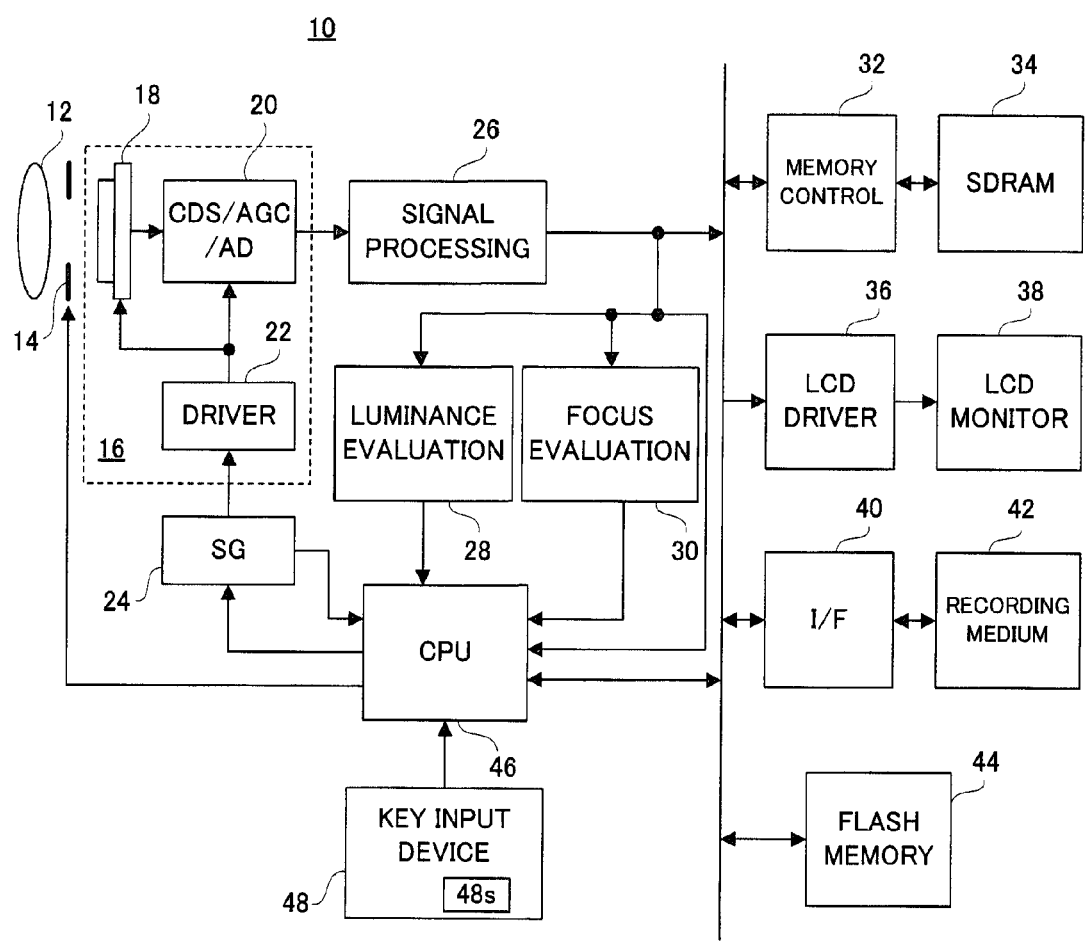
FIG. 1 is a block diagram showing a configuration of one embodiment of the present invention.

With reference to FIG. 1, a digital camera 10 according to this embodiment includes a focus lens 12 and an aperture unit 14. An optical image of an object scene through these members is irradiated onto a front surface, i.e., an imaging surface of an imaging portion 18 configuring a CMOS-type image sensor 16, and is then photoelectrically converted. Thereby, a raw image signal formed of electric charges representing an object scene image is generated.

When a power source is turned on, a through-image process is executed. A CPU 46 instructs a driver 22 configuring the image sensor 16 to repeat pre-exposure operations and thin-out reading operations. The driver 22 exposes the imaging surface at each time a vertical synchronization signal Vsync is outputted from an SG (Signal Generator) 24, and reads out a part of the electric charges thus generated from the imaging portion 18 in a raster scanning mode. The vertical synchronization signal Vsync is outputted from the SG 24 at every 1/60 seconds. As a result, a low-resolution raw image signal is outputted from the imaging portion 18 at every 1/60 seconds. It is noted that a generation cycle of the vertical synchronization signal Vsync is assumed as 1/60 seconds in this embodiment but the generation cycle is not limited thereto.

The raw image signal of each frame, outputted from the imaging portion 18, is subjected to a series of processes such as a correlation double sampling, an automatic gain adjustment, and an A/D conversion by a CDS/AGC/AD circuit 20 configuring the image sensor 16. A signal-processing circuit 26 applies processes such as a white balance adjustment, a color separation, and a YUV conversion to the raw image data outputted from the CDS/AGC/AD circuit 20 and writes YUV-formatted image data to an SDRAM 34 through a memory control circuit 32.

An LCD driver 36 reads out the image data thus written to the SDRAM 34 through the memory control circuit 32 at every 1/60 seconds, and drives an LCD monitor 38 based on the read-out image data. As a result, a real-time moving image (a through image) of the object scene is displayed on a monitor screen.

Figure 2:
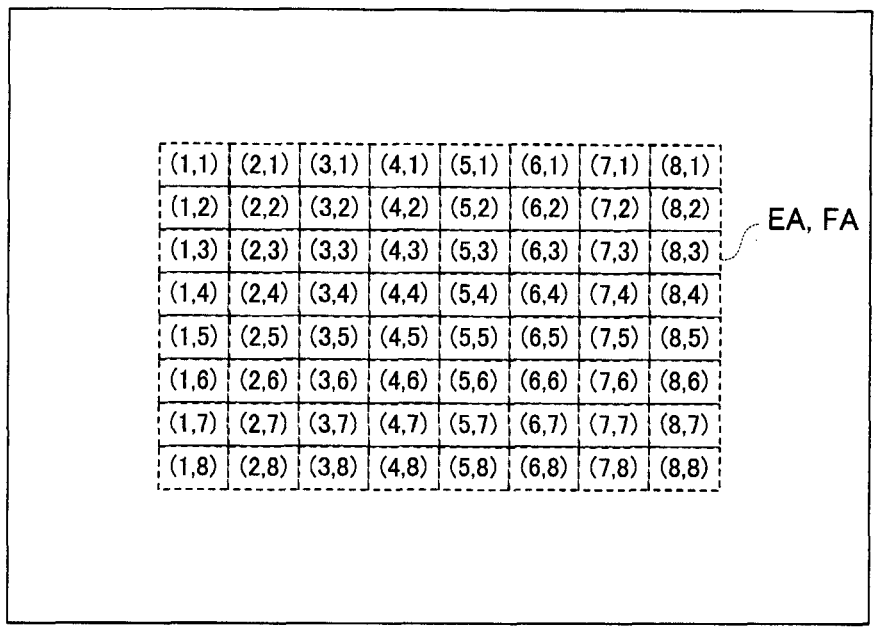
FIG. 2 is an illustrative view showing one example of a photometric area and a focus area allocated on an imaging surface.

With reference to FIG. 2, a photometric area EA and a focus area FA are allocated in a center of the imaging surface. The photometric area EA and the focus area FA have the same size to each other and are arranged in the same position to each other. Also, both the photometric area EA and the focus area FA are divided into eight parts in each of a vertical direction and a horizontal direction. That is, each of the photometric area EA and the focus area FA is formed of 64 evaluation areas having the same size to each other. These 64 evaluation areas are respectively allocated with coordinate values (X, Y)=(1, 1) to (8, 8).

A luminance evaluation circuit 28 integrates Y data belonging to each evaluation area, out of the Y data outputted from the signal-processing circuit 26, at every 1/60 seconds, and then, calculates 64 luminance evaluation values (brightness information) respectively corresponding to the 64 evaluation areas at every 1/60 seconds. A focus evaluation circuit 30 integrates a high-frequency component of the Y data belonging to each evaluation area, out of the Y data outputted from the signal-processing circuit 26, at every 1/60 seconds, and then, calculates 64 focus evaluation values (focus degree information) respectively corresponding to the 64 evaluation areas at every 1/60 seconds.

In order to calculate an appropriate EV value based on the luminance evaluation values outputted from the luminance evaluation circuit 28, the CPU 46 repeatedly executes AE processes for the through-image, in parallel with the above-described through-image process. An amount of aperture and an exposure time period, which define the calculated appropriate EV value, are set to the aperture unit 14 and the driver 22, respectively. As a result, a brightness of the through image displayed on the LCD monitor 38 is appropriately adjusted.

When a shutter button 48s on a key input device 48 is operated, the CPU 46 executes an AE process for recording in order to calculate an optimal EV value based on the luminance evaluation values outputted from the luminance evaluation circuit 28. An amount of aperture and an exposure time period, which define the calculated optimal EV value, are set to the aperture unit 14 and the driver 22, respectively, in the same manner as described above. The CPU 46 further executes an AF process based on the focus evaluation values outputted from the focus evaluation circuit 30. The focus lens 12 is arranged at a focal point by the AF process.

When the AF process is completed, a recording process is executed. The CPU 46 instructs the driver 22 to execute a main exposure operation and all-pixel reading, one time each. The driver 22 applies a main exposure to the imaging surface in response to a generation of the vertical synchronization signal Vsync and reads out all the electric charges thus generated from the imaging portion 18 in a raster scanning mode. As a result, the high-resolution raw image signal representing the object scene is outputted from the imaging portion 18.

The outputted raw image signal is processed with similar processes as described above, and thus, the high-resolution image data according to the YUV format is saved in the SDRAM 34. An I/F 40 reads out the high-resolution image data thus stored in the SDRAM 34 through the memory control circuit 32, and then, records the read-out image data on a recording medium 42 in a file format. It is noted that the through-image process is resumed when the high-resolution image data is stored in the SDRAM 34.

Figure 3:
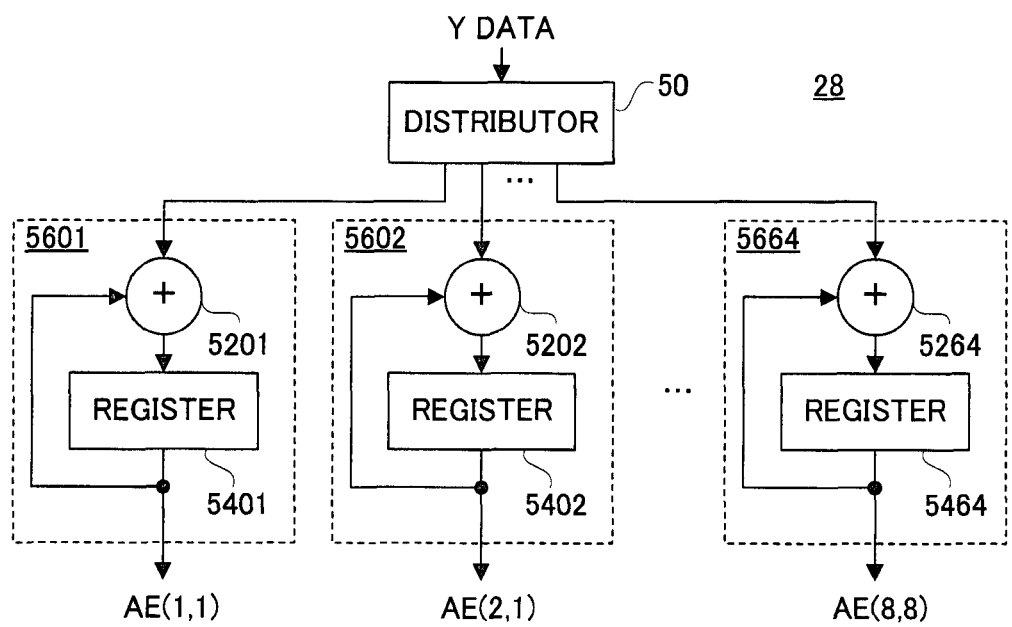
FIG. 3 is a block diagram showing one example of a configuration of a luminance evaluation circuit applied to the embodiment in FIG. 1.

With reference to FIG. 3, the luminance evaluation circuit 28 includes one distributor 50 and 64 integration circuits 5601 to 5664. The 64 integration circuits 5601 to 5664 respectively correspond to the 64 evaluation areas. The distributor 50 fetches the Y data outputted from the signal-processing circuit 26, specifies the evaluation area to which the fetched Y data belongs, and applies the fetched Y data to the integration circuit corresponding to the specified evaluation area.

The integration circuit 56\*\* (\*\*: 01 to 64) is formed of an adder 52\*\* and a register 54\*\*. The adder 52\*\* adds a Y data value applied from the distributor 50, with a setting value of the register 54\*\*, and then, sets the added value to the register 54\*\*. The setting value of the register 54\*\* is cleared at each generation of the vertical synchronization signal Vsync. Therefore, the setting value of the register 54\*\* represents an integrated value of the Y data belonging to each evaluation area of a current frame. This integrated value corresponds to the above-described luminance evaluation value. Hereinafter, the luminance evaluation value acquired on the evaluation area (X, Y) is defined as "AE (X, Y)".

Figure 4:
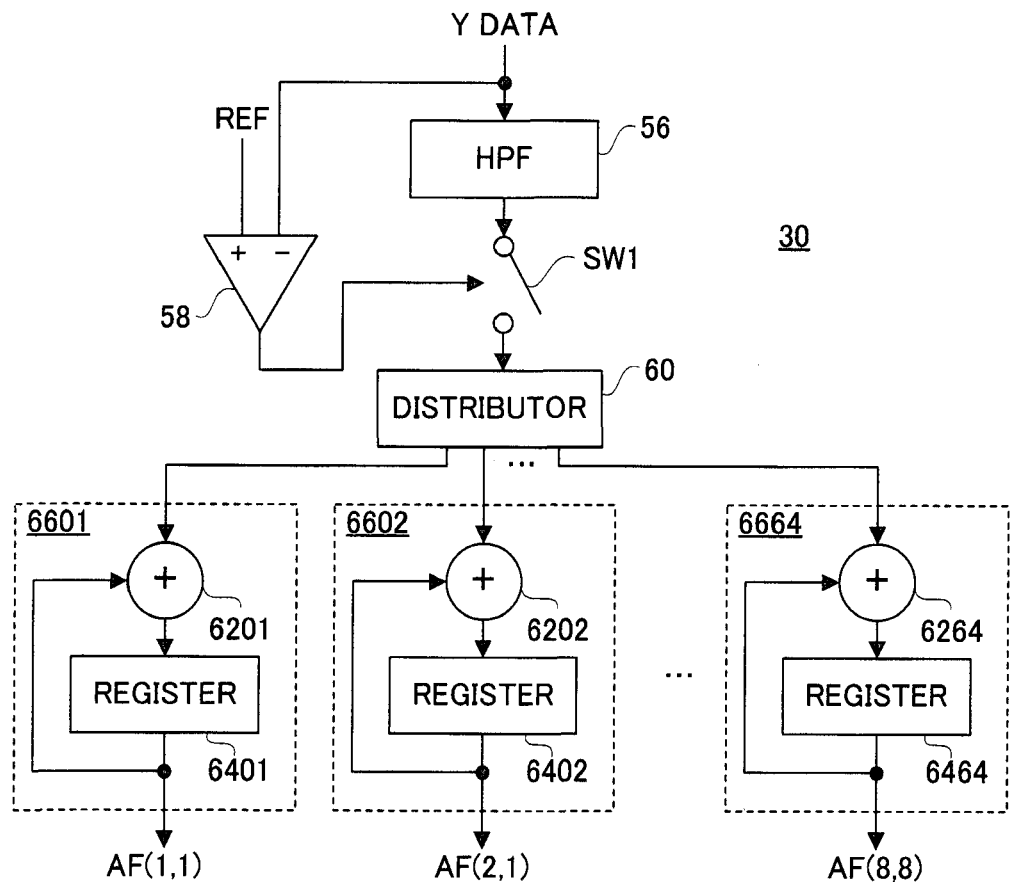
FIG. 4 is a block diagram showing one example of a configuration of a focus evaluation circuit applied to the embodiment in FIG. 1.

With reference to FIG. 4, the focus evaluation circuit 30 includes an HPF 56 for extracting the high-frequency component of the Y data outputted from the signal-processing circuit 26, and a comparator 58 for comparing, with a reference value REF, the Y data value outputted from the signal-processing circuit 26. The comparator 58 turns on a switch SW1 when the Y data value is equal to or less than the reference value REF, and turns off the switch SW1 when the Y data value exceeds the reference value REF. The high-frequency component outputted from the HPF 56 is applied to a distributor 60 via the switch SW1.

The integration circuits 6601 to 6664 respectively correspond to the 64 evaluation areas in the same manner as described above. The distributor 60 fetches the high-frequency component outputted from the switch SW1, specifies the evaluation area to which the fetched high-frequency component belongs, and applies the fetched high-frequency component to the integration circuit corresponding to the specified evaluation area.

The integration circuit 66\*\* is formed of an adder 62\*\* and a register 64\*\*. The adder 62\*\* adds the Y data value applied from the distributor 60, with a setting value in the register 64\*\*, and then, sets the added value to the register 64\*\*. The setting value in the register 64\*\* is also cleared at each generation of the vertical synchronization signal Vsync. Therefore, the setting value of the register 64\*\* represents the integrated value of the high-frequency component of the Y data belonging to each evaluation area of the current frame. This integrated value corresponds to the above-described focus evaluation value. Hereinafter, the focus evaluation value acquired on the evaluation area (X, Y) is defined as "AF (X, Y)".

Figure 5:
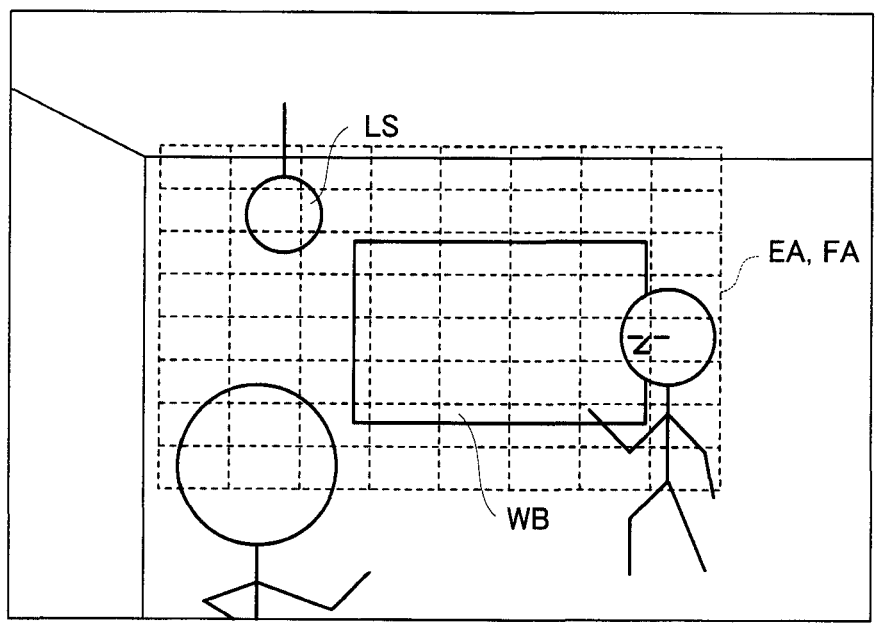
FIG. 5 is an illustrative view showing one example of an object scene captured by the embodiment in FIG. 1.
Figure 6:
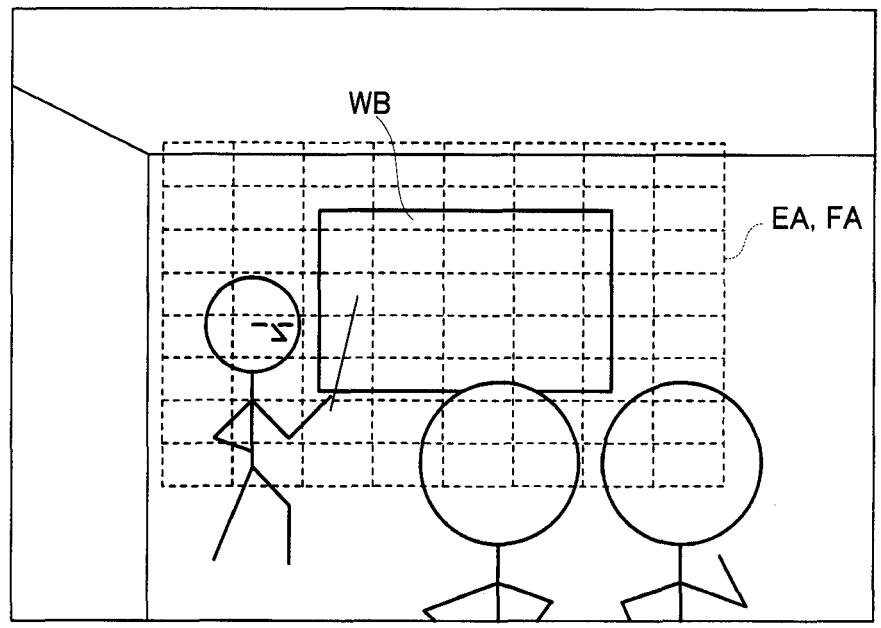
FIG. 6 is an illustrative view showing another example of the object scene captured by the embodiment in FIG. 1.
Figure 7:
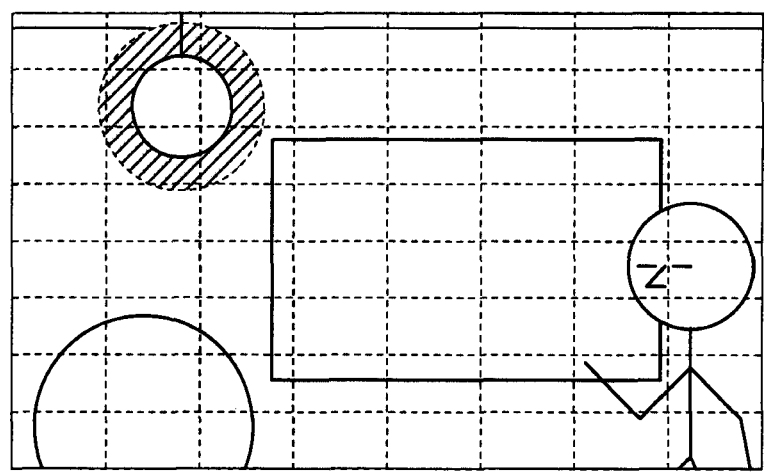
FIG. 7 is an illustrative view showing one portion of an operation of the embodiment in FIG. 1.

Each of FIG. 5 and FIG. 6 shows an object scene image when capturing a scene of a class in a woodwork classroom equipped with a whiteboard WB. A main difference between FIG. 5 and FIG. 6 is presence of a light source LS. When the object scene shown in FIG. 5 is captured by focusing on an object different from the light source LS, a blurred image caused by defocusing of the light source LS notably appears on a periphery of an image representing the light source LS (see FIG. 7). On the other hand, in an object different from the light source, such as the whiteboard WB, the blurred image caused by the defocusing does not notably appear on a periphery of the object.

A size of the blurred image that appears on a periphery of the light source LS increases as a degree of focus on the light source LS decreases. Generally, the Y data value of the light source LS is saturated, and thus, an amount of the high-frequency component corresponding to an edge of the image representing the light source LS, i.e., the focus evaluation value, increases as the degree of focus on the light source LS decreases. Thereby, when the AF process is executed in view of the light source LS, there is a possibility that the focus lens 12 may be set to a defocusing position.

Considering the above fact, in this embodiment, a light-source determining process for determining whether or not the object scene includes a light source is executed prior to the AF process, and thereby, a magnitude of the reference value REF applied to a + (positive) terminal of the comparator 58 shown in FIG. 4 is changed depending upon a determined result. The reference value REF is set to "TH1" corresponding to the object scene that includes the light source LS as shown in FIG. 5, whereas it is set to "THmax" corresponding to the object scene that does not include a light source LS as shown in FIG. 6. It is noted that "THmax" corresponds to a luminance saturation value, and "TH1" is less than "THmax".

In order to determine whether or not the light source LS is included, a ratio of a partial image having a Y data value above "TH2" to a partial image having a Y data value above "TH1" is referenced (TH2>TH1). More specifically, the number of pixels in which the Y data value exceeds "TH1" is evaluated as a coefficient K1, and the number of pixels in which the Y data value exceeds "TH2" is evaluated as a coefficient K2, and then, "K2/K1" is compared with a threshold value THR. When "K2/K1" exceeds the threshold value THR, it is interpreted that the light source LS is present, and thus, the reference value REF is set to "TH1". On the other hand, when "K2/K1" is equal to or less than the threshold value THR, it is interpreted that the light source LS is not present, and thus, the reference value REF is set to "THmax".

Figure 8:
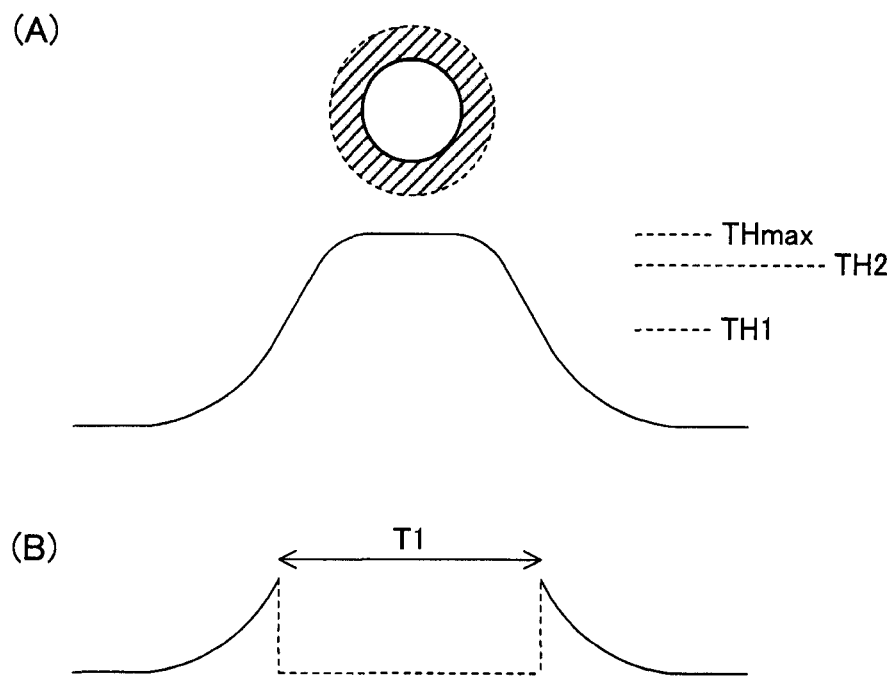
FIG. 8(A) is an illustrative view showing one example of a change of Y data on a light source and a periphery thereof.
FIG. 8(B) is an illustrative view showing one example of a change of Y data of which the one portion is missing by a high-luminance excluding function.
Figure 9:
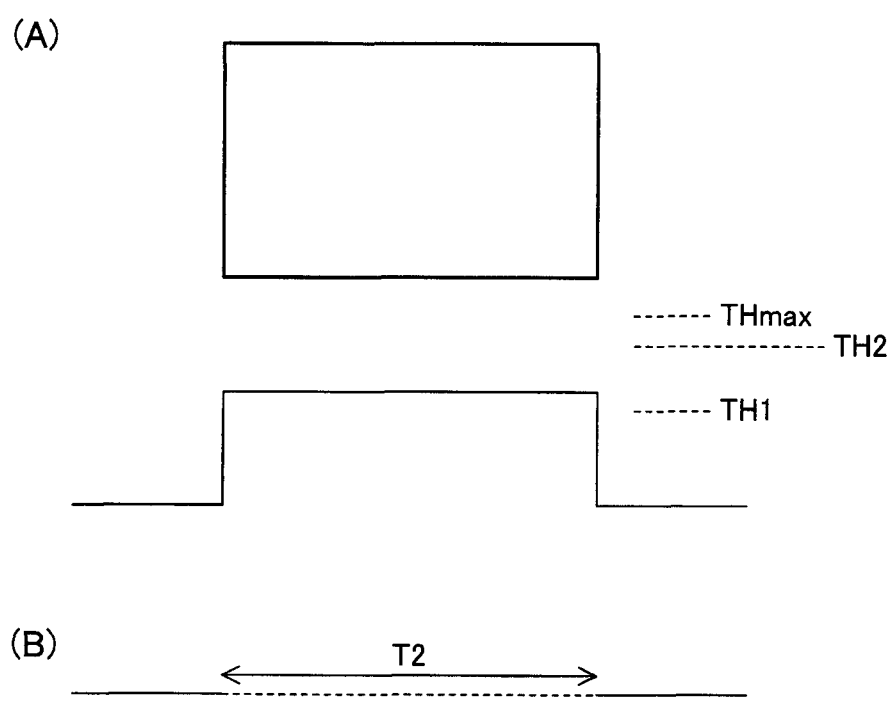
FIG. 9(A) is an illustrative view showing one example of a change of Y data on a white board and a periphery thereof.
FIG. 9(B) is an illustrative view showing one example of a change of Y data of which the one portion is missing by the high-luminance excluding function.

As described above, when photographing the object scene shown in FIG. 5, the reference value REF is set to "TH1", and when photographing the object scene shown in FIG. 6, the reference value REF is set to "THmax". When Y data on the light source LS shown in FIG. 5 and a periphery thereof are changed in a manner shown in FIG. 8(A); and Y data on the whiteboard WB shown in FIG. 5 or FIG. 6 and a periphery thereof are changed in a manner shown in FIG. 9(A), an operation of the focus evaluation circuit 30 differs between the object scene shown in FIG. 5 and the object scene shown in FIG. 6 as follows:

When photographing the object scene shown in FIG. 5, the switch SW1 is turned off during a time period T1 shown in FIG. 8(B) and a time period T2 shown in FIG. 9(B). As a result, the images of the light source LS and the whiteboard WB as well as the periphery thereof are excluded from a target of the integral processes executed by the integration circuits 6601 to 6664. On the other hand, when photographing the object scene shown in FIG. 6, the switch SW1 is turned on at all times. The integration circuits 6601 to 8864 execute integral processes to all the object scene images belonging to the focus area FA.

A high-luminance excluding function (a function for excluding the high luminance image above "TH1" from the focus evaluation target), which is described above, is turned on when capturing the object scene including the light source LS shown in FIG. 5, thereby making it possible to avoid a situation in which focusing control fails due to the blurred image of the light source LS. Also, the high-luminance excluding function is turned off when capturing the object scene that does not include the light source LS shown in FIG. 6, thereby enabling the whiteboard WB to be included in the focus evaluation target, thus stabilizing the focusing control.

However, according to FIG. 8(A) and FIG. 8(B), the high-frequency components outputted from the HPF 56 immediately before and after the time period T1 are included in the target of the integral processes executed by the integration circuits 6601 to 6664. As a result, the blurred image of the light source LS may hinder the coned focusing control. To avoid this problem, when "TH1" is set lower, the high-frequency component of the blurred image may surely be excluded from the target of the integral process, but this will cause the high-frequency component of a moderate luminance object to be excluded from the target of the integral process, and thus, the focusing control may become impossible.

Considering the above fact, in this embodiment, the focus evaluation value AF (X, Y) acquired by the integral process is modified into a smaller value, as brightness of the evaluation area (X, Y) and that of surrounding evaluation areas are higher. As a result, the focusing control is executed by considering the high-frequency component of a low-luminance image rather than the high-frequency component of a high-luminance image.

More specifically, the focus evaluation value AF (X, Y) is modified by the CPU 46 according to a manner described below. At first, the focus evaluation value AF (X, Y) is compared with a threshold value THL1. When AF (X, Y)>THL1, the focus evaluation value AF (X, Y) is modified according to Equation 1.

$$AF(X,Y)=AF(X,Y)-AE(X,Y)*\alpha \quad \text{[Equation 1]}$$

α: a constant for normalization

According to Equation 1, the focus evaluation value AF (X, Y) is subtracted by a numerical value that is a times the luminance evaluation value AE (X, Y).

When AF (X, Y)≦THL1, focus evaluation values AF (X−1, Y), AF (X+1, Y), AF (X, Y−1), or AF (X, Y+1) acquired on adjacent evaluation areas (X−1, Y), (X+1, Y), (X, Y−1), or (X, Y+1) are compared with a threshold value THL2.

The focus evaluation value AF (X, Y) is modified according to Equation 2 when AF (X−1, Y)>THL2; according to Equation 3 when AF (X+1, Y)>THL2; according to Equation 4 when AF (X, Y−1)>THL2; and according to Equation 5 when AF (X, Y+1)>THL2. It is noted that the threshold value THL2 is smaller than the threshold value THL1.

$$AF(X,Y)=AF(X,Y)-|AE(X-1,Y)-AE(X,Y)|*\beta \quad \text{[Equation 2]}$$

β: a constant for normalization $$AF(X,Y)=AF(X,Y)-|AE(X+1,Y)-AE(X,Y)|*\beta \quad \text{[Equation 3]}$$

$$AF(X,Y)=AF(X,Y)-|AE(X,Y-1)-AE(X,Y)|*\beta \quad \text{[Equation 4]}$$

$$AF(X,Y)=AF(X,Y)-|AE(X,Y+1)-AE(X,Y)|*\beta \quad \text{[Equation 5]}$$

According to Equation 2, the focus evaluation value AF (X, Y) is subtracted by a numerical value that is β times an absolute value of a difference between luminance evaluation values AE (X−1, Y) and AE (X, Y). According to Equation 3, the focus evaluation value AF (X, Y) is subtracted by a numerical value that is β times an absolute value of a difference between luminance evaluation values AE (X+1, Y) and AE (X, Y). According to Equation 4, the focus evaluation value AF (X, Y) is subtracted by a numerical value that is β times an absolute value of a difference between luminance evaluation values AE (X, Y−1) and AE (X, Y). According to Equation 5, the focus evaluation value AF (X, Y) is subtracted by a numerical value that is β times an absolute value of a difference between luminance evaluation values AE (X, Y+1) and AE (X, Y).

Figure 10:
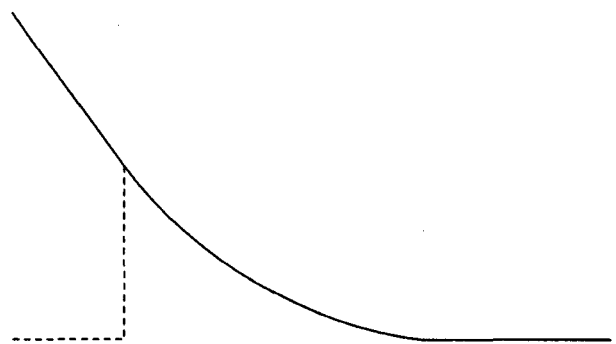
FIG. 10(A) is an illustrative view showing one example of a change of the Y data.
FIG. 10(B) is an illustrative view showing one portion of an arrangement of an evaluation area.
FIG. 10(C) is an illustrative view showing one example of a change of luminance evaluation values.
Figure 10:
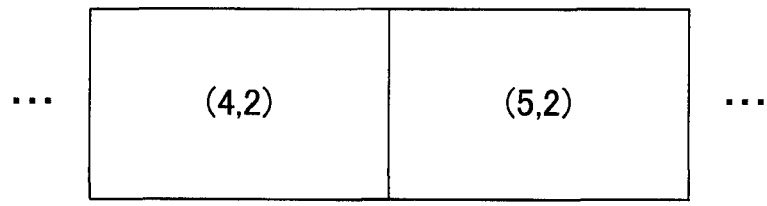
Figure 10:
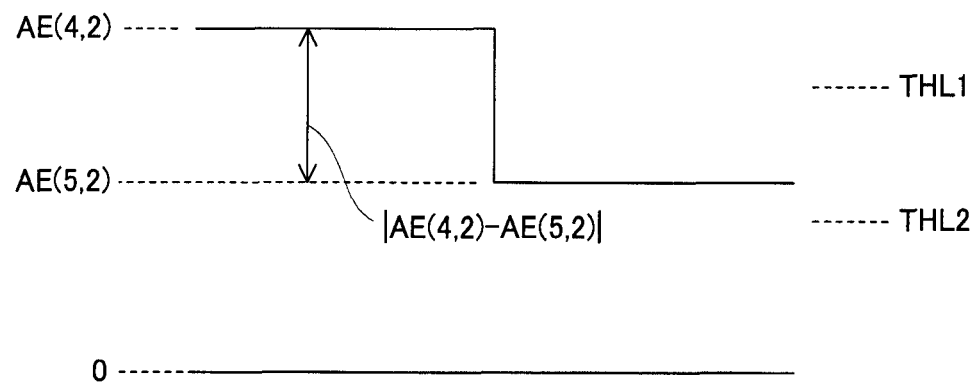

With reference to FIGS. 10(A) to 10(C), when the luminance evaluation values AE (4, 2) and AE (5, 2) based on the Y data adjacent to an end of the above-described time period T1 respectively satisfy conditions of AE (4, 2)>THL1 and AE (5, 2)≦THL1, the focus evaluation value AF (4, 2) is modified according to Equation 1, and the focus evaluation value AF (5, 2) is modified according to Equation 2. To be exact, the focus evaluation value AF (4, 2) is modified according to Equation 1 when "AE (4, 2)>THL1", while the focus evaluation value AF (5, 2) is modified according to Equation 2 when "AE (4, 2)>THL2" and "AE (5, 2)≦THL1". However, "THL1>THL2" is established, and thus, when "AE (4, 2)>THL1" is satisfied, "AE (4, 2)>THL2" is also satisfied. Considering this, in the above description, only "AE (5, 2)≦THL1" is given as a condition for modifying the focus evaluation value AF (5, 2) according to Equation 2.

The CPU 46 executes a plurality of tasks, including image-controlling tasks shown in FIG. 11 to FIG. 14, in a parallel manner. It is noted that a control program corresponding to these tasks is stored in a flash memory 44.

Figure 11:
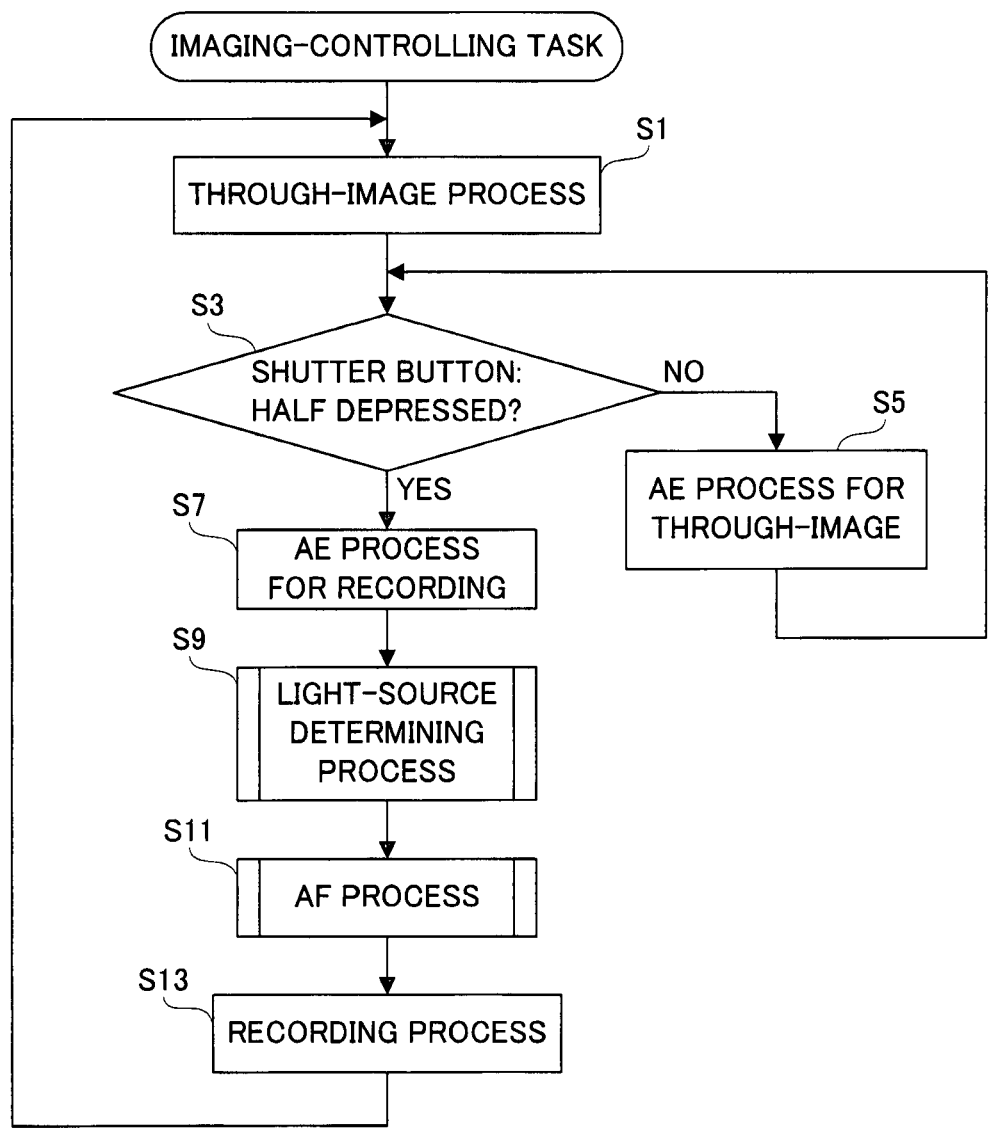
FIG. 11 is a flowchart showing one portion of an operation of a CPU applied to the embodiment in FIG. 1.

With reference to FIG. 11, the through-image process is executed in a step S1. As a result, the through-image representing the object scene is outputted from the LCD monitor 38. In a step S3, it is determined whether or not the shutter button 48s is operated. As long as NO is determined, the AE process for the through-image in a step S5 is repeatedly executed. As a result, the brightness of the through-image displayed on the LCD monitor 38 is appropriately adjusted. When the shutter button 48s is operated, the AE process for recording is executed in a step S7, the light-source determining process is executed in a step S9, the AF process is executed in a step S11, and the recording process is executed in a step S13.

As a result of the process in the step S7, the amount of aperture and the exposure time period, which define the optimal EV value, are set to the aperture unit 14 and the driver 22, respectively. Also, as a result of the process in the step S9, the "TH1" is set to the reference value REF when capturing the object scene including the light source, while the "THmax" is set to the reference value REF when capturing the object scene that does not include the light source. Furthermore, as a result of the process in the step S11, the focus lens 12 is arranged at the focal point. Also, as a result of the process in the step S13, the high-resolution image data representing an object scene immediately after the focus lens 12 is arranged at the focal point is recorded on the recording medium 42.

Figure 12:
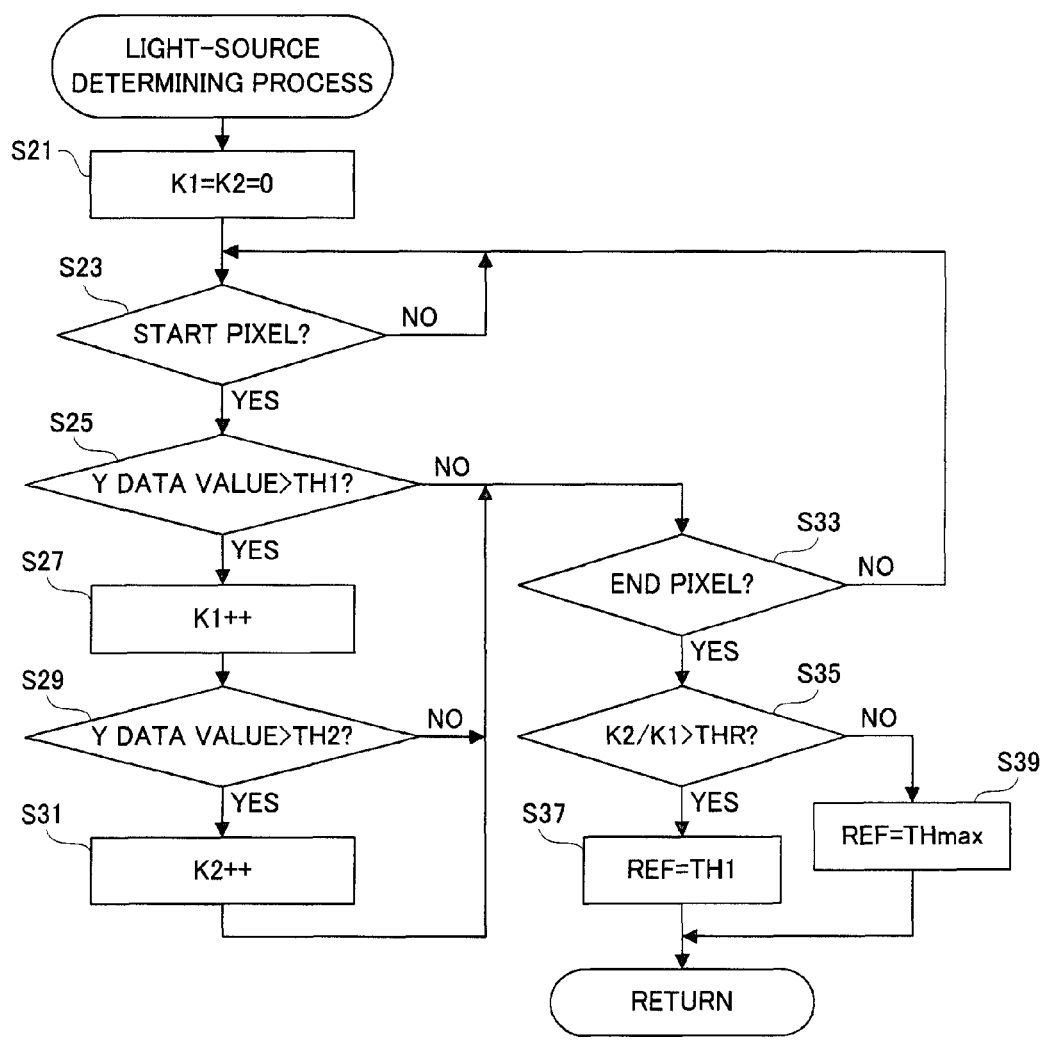
FIG. 12 is a flowchart showing another portion of the operation of the CPU applied to the embodiment in FIG. 1.

The light-source determining process in the step S9 shown in FIG. 11 is executed according to a subroutine shown in FIG. 12. In a step S21, each of the coefficients K1 and K2 is set to "0" in response to the generation of the vertical synchronization signal Vsync. In a step S23, it is determined whether or not a current pixel is a start pixel (a pixel arranged at an upper left in the coordinate) for the focus area FA, and when YES is determined, it is determined in a step S25 whether or not the Y data value of the current pixel exceeds "TH1". When the Y data value>TH1 is established, the process proceeds from the step S25 to a step S27 to increment the coefficient K1. In a step S29, it is determined whether or not the Y data value of the current pixel exceeds "TH2", and when YES is determined, the coefficient K2 is incremented in a step S31. Because TH2>TH1 is established, when the Y data value exceeds "TH1" and equal to or less than "TH2", only the coefficient K1 is incremented, and when the Y data value exceeds "TH2", the coefficients K1 and K2 are both incremented.

When NO is determined in the steps S25 or S29 or upon completion of the process in the step S31, it is determined whether or not the current pixel is an end pixel (a pixel arranged at a lower right in the coordinate) of the focus area FA. When NO is determined in this step, the process returns to the step S23. However, when YES is determined, the process proceeds to a step S35. In the step S35, it is determined whether or not the ratio of the coefficient K2 to the coefficient K1, i.e., K2/K1, exceeds the threshold value THR. When YES is determined in this step, the process proceeds to a step S37 to set "TH1" as the reference value REF. On the other hand, when NO is determined, the process proceeds to a step S39 to set "THmax" to the reference value REF. Upon completion of the process in the step S37 or S39, the process returns to an upper hierarchical routine.

Figure 13:
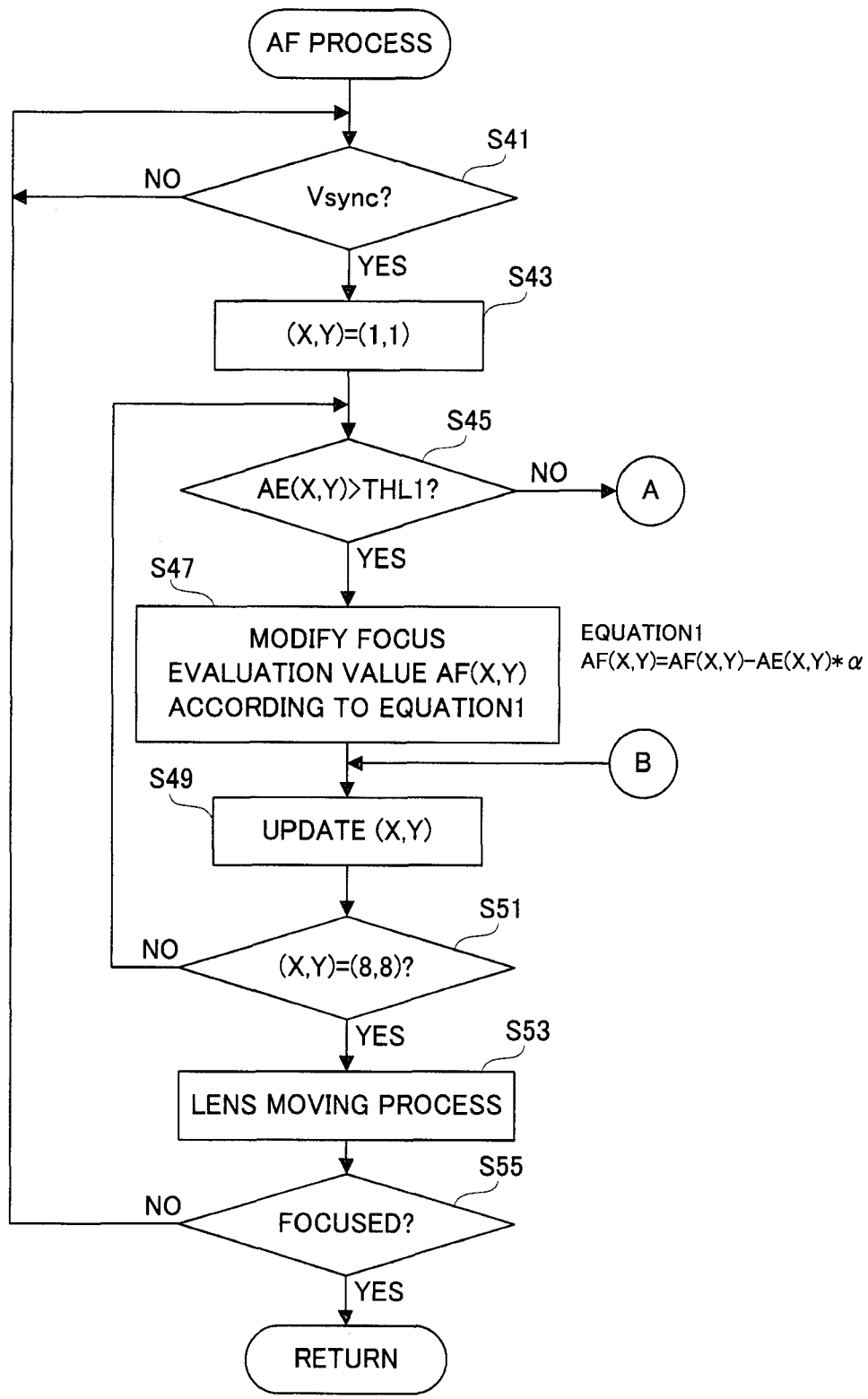
FIG. 13 is a flowchart showing still another portion of the operation of the CPU applied to the embodiment in FIG. 1.
Figure 14:
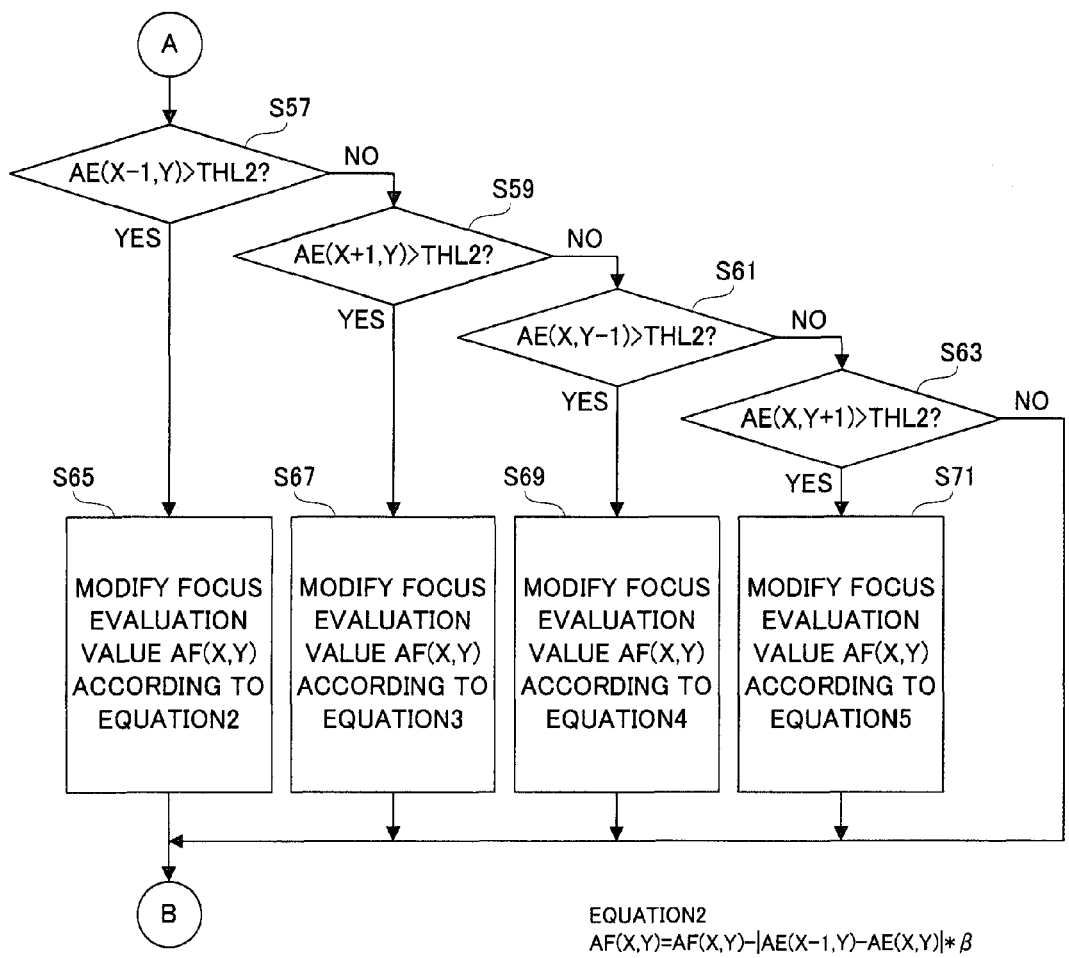
FIG. 14 is a flowchart showing yet still another portion of the operation of the CPU applied to the embodiment in FIG. 1.

The AF process in the step S11 shown in FIG. 11 is executed according to a subroutine shown in FIGS. 13 and 14. When the vertical synchronization signal Vsync is generated, YES is determined in a step S41, and the coordinate value (X, Y) is set to (1, 1). In a step S45, it is determined whether or not the luminance evaluation value AE (X, Y) exceeds the threshold value THL1. When YES is determined in this step, the process proceeds to a step S47 to modify the focus evaluation value AF (X, Y) according to Equation 1. In a step S49, the coordinate value (X, Y) is updated in a raster scanning direction, and in a step S51, it is determined whether or not the updated coordinate value (X, Y) shows (8, 8).

When NO is determined in this step, the process returns to the step S45, and when YES is determined, a lens moving process (hill-climbing AF process) is executed in a step S53. As a result of the process in the step S53, the focus lens 12 moves in a direction in which a total value of the focus evaluation values AF (1, 1) to AF (8, 8) increases. In a step S55, it is determined whether or not the focus lens 12 reaches a focal point, and when NO is determined, the process returns to the step S41. However, when YES is determined, the process returns to an upper hierarchical routine.

When NO is determined in the step S45, it is determined whether or not the focus evaluation value AF (X−1, Y) exceeds the threshold value THL2 in a step S57, whether or not the focus evaluation value AF (X+1, Y) exceeds the threshold value THL2 in a step S59, whether or not the focus evaluation value AF (X, Y−1) exceeds the threshold value THL2 in a step S61, and whether or not the focus evaluation value AF (X, Y+1) exceeds the threshold value THL2 in a step S63.

When YES is determined in the step S57, the process proceeds to a step S65 to modify the focus evaluation value AF (X, Y) according to Equation 2. When YES is determined in the step S59, the process proceeds to a step S67 to modify the focus evaluation value AF (X, Y) according to Equation 3. When YES is determined in the step S61, the process proceeds to a step S69 to modify the focus evaluation value AF (X, Y) according to Equation 4. When YES is determined in the step S63, the process proceeds to a step S71 to modify the focus evaluation value AF (X, Y) according to Equation 5.

Upon completion of the process in the step S65, S67, S69, or S71, or when NO is determined in any of the steps S57, S59, S61, and S63, the process returns to the step S49.

As is apparent from the above descriptions, the image sensor 16 has an imaging surface irradiated with the optical image of the object scene through the focus lens 12, and repeatedly generates the object scene images. The focus evaluation circuit 30 allocates a plurality of evaluation areas on the object scene captured by the imaging surface and detects the degree of focus of the partial image belonging to each of the plurality of evaluation areas.

However, the CPU 46 has the high-luminance excluding function (S37) for excluding, from a target to be noticed of the focus evaluation circuit 30, the partial image having a luminance exceeding "TH1", out of the object scene image generated by the image sensor 16. The CPU 46 determines whether or not a partial image having a luminance exceeding "TH2", which is greater than "TH1", is present on the object scene image, and turns on the high-luminance excluding function when the determination result is affirmative, whereas the CPU 46 turns off the high-luminance excluding function when the determination result is negative (S35, S39).

The CPU 46 also sequentially designates, as an area to be noticed, each of the plurality of evaluation areas allocated on the object scene image (S43, S49), and modifies, to a lower value, the degree of focus detected corresponding to the area to be noticed, as the brightness of the partial image belonging to one or more areas including the area to be noticed is higher (S47, S65 to S71).

The CPU 46 executes the hill-climbing AF process with reference to the degree of focus thus modified. The focus lens 12 is positioned at the focal point by the hill-climbing AF process.

When an image of a white subject such as a whiteboard WB is assumed as a partial image having a luminance exceeding "TH1" and equal to or less than "TH2", and an image of the light source LS is assumed as a partial image having the luminance exceeding "TH2", a focus adjustment operation differs between a case of capturing an object scene including both the whiteboard WB and the light source LS and that of capturing an object scene including only the whiteboard WB out of the whiteboard WB and the light source LS as follows:

That is, the high-luminance excluding function is turned on when capturing the former object scene, and thus, the focusing adjustment operation is executed with reference to objects other than the whiteboard WB and the light source LS. On the other hand, the high-luminance excluding function is turned off when capturing the latter object scene, and thus, the focusing adjustment operation is executed with reference to objects that include the whiteboard WB.

Also, the degree of focus of the area to be noticed is modified into a smaller value, as the brightness of the area that includes the area to be noticed is higher. As a result, the focusing adjustment operation is executed by applying much importance to a low-luminance image than to a high-luminance image.

As a result, it becomes possible to correctly arrange the focus lens 12 at the focal point while avoiding the defocusing caused by the blurred image on a periphery of the light source LS.

Figure 15:
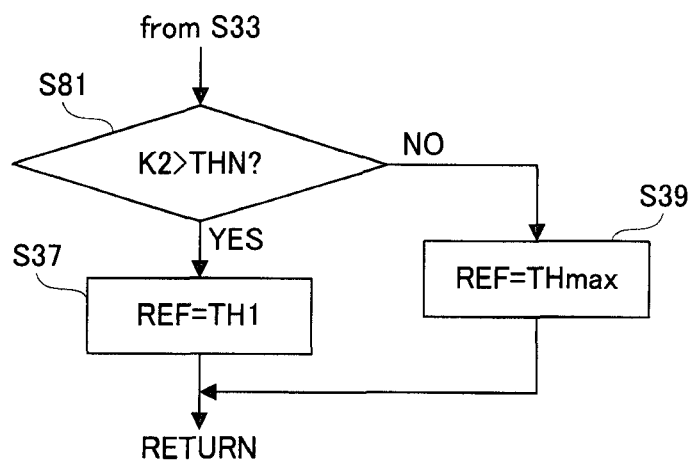
FIG. 15 is a flowchart showing one portion of a modified example of the embodiment in FIG. 12.

It is noted that the light-source determining process shown in FIG. 12 focuses on the ratio of the coefficient K2 to the coefficient K1 (K2/K1) in order to determine which value, i.e., "TH1" or "THmax", is used as the reference value REF, and however, instead thereof, the magnitude of the coefficient K2, i.e., the number of pixels in which the Y data value exceeds "TH2", may be focused. In this case, as shown in FIG. 15, it is preferable to execute a step S81 for determining whether or not the coefficient K2 exceeds a threshold value THN instead of the step S35 shown in FIG. 12. When the step S81 is replaced by the step S35, the steps S25 to S27 shown in FIG. 12 may not necessarily be executed.

Also, in the light-source determining process shown in FIG. 12, only "TH1" is used as the numerical value set to the reference value REF when the light source LS is present. However, the numerical value set to the reference value REF when the light source LS is present may be changed according to a size of the image corresponding to the light source LS. In this case, it is preferable to add a step S35' and a step S37' shown in FIG. 16 to the process shown in FIG. 12, or add a step S81' and a step S37' shown in FIG. 17 to the process shown in FIG. 15.

Figure 16:
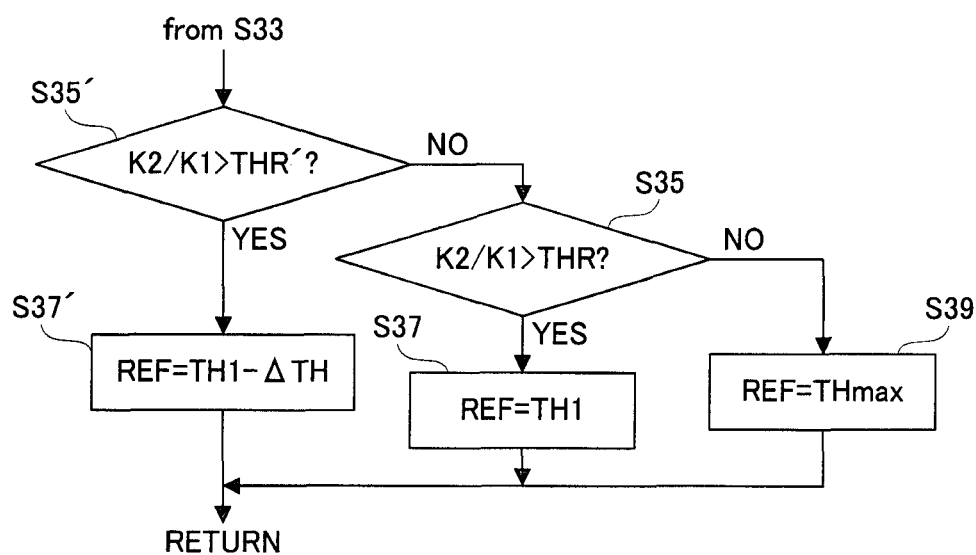
FIG. 16 is a flowchart showing one portion of another modified example of the embodiment in FIG. 12.
Figure 17:
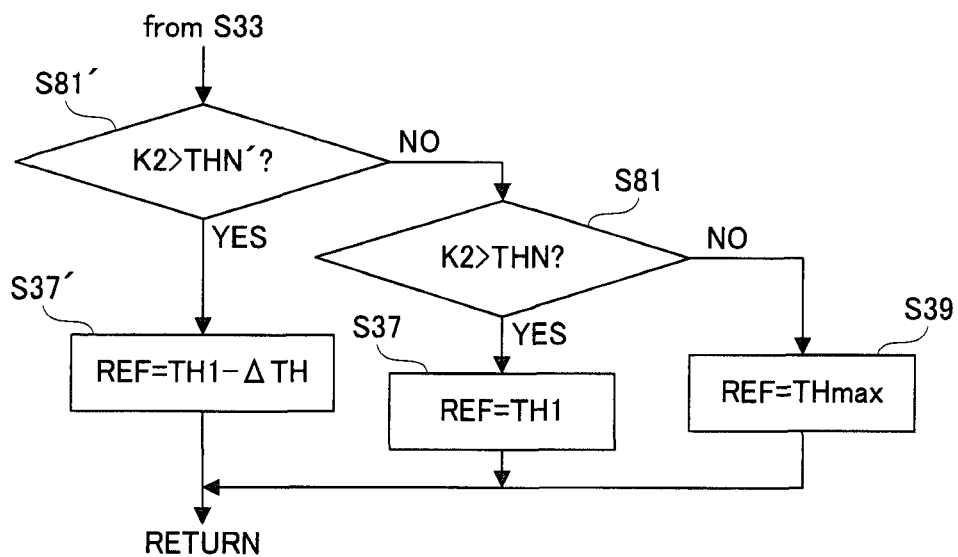
FIG. 17 is a flowchart showing one portion of still another modified example of the embodiment in FIG. 12.

According to FIG. 16, it is determined whether or not "K2/K1" exceeds a threshold value THR' (THR'>THR) in the step S35'. When YES is determined in this step, "TH1−ΔTH" is set to the reference value REF in the step S37'. According to FIG. 17, it is determined whether or not "K2" exceeds the threshold value THN' (THN'>THN) in the step S81'. When YES is determined in this step, "TH1−ΔTH" is set to the reference value REF in the step S37'.

Figure 18:
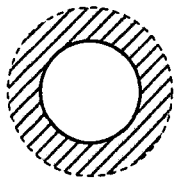
FIG. 18(A) is an illustrative view showing another example of a change of Y data on the light source and a periphery thereof.
FIG. 18(B) is an illustrative view showing another example of a change of the Y data of which the one portion is missing by the high-luminance excluding function.
Figure 18:
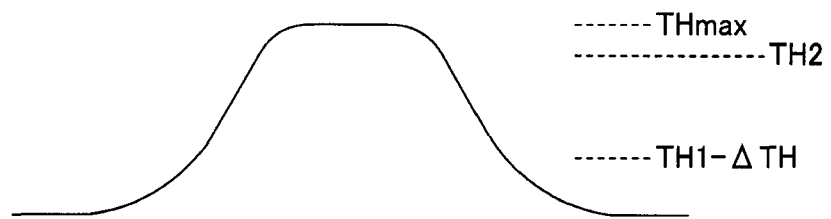
Figure 18:

As a result, when the Y data representing the light source LS changes as shown in FIG. 18(A), the switch SW1 shown in FIG. 4 is turned off during a time period T3 shown in FIG. 18(B). By executing the processes shown in FIG. 16 or FIG. 17, it becomes possible to switch a magnitude of the high-luminance excluding function according to the size of the image representing the light source LS.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
an imager, having an imaging surface irradiated with an optical image of a scene through an optical lens, which repeatedly generates a scene image;
an allocator which allocates a plurality of areas on the scene captured by said imaging surface;
a detector which detects a degree of focus of a partial image belonging to each of the plurality of areas allocated by said allocator, out of the scene image generated by said imager;
a designator which sequentially designates each of the plurality of areas allocated by said allocator as an area to be noticed;
a modifier which modifies the degree of focus detected by said detector corresponding to the area to be noticed to a lower value, as a brightness of the partial image belonging to one or more areas including the area to be noticed is higher; and
an adjustor which adjusts a distance from said optical lens to said imaging surface to a distance corresponding to a focal point by referencing the degree of focus modified by said modifier.

2. An electronic camera according to claim 1, wherein said modifier includes a first modifier which executes a first modification process according to a first arithmetic expression when a brightness of a partial image belonging to the area to be noticed exceeds a first threshold value, and a second modifier which executes a second modification process according to a second arithmetic expression when a brightness of a partial image belonging to an adjacent area adjacent to the area to be noticed exceeds a second threshold value.

3. An electronic camera according to claim 2, wherein the first modification process and the second modification process are selectively executed, and the first modification process takes precedence to the second modification process.

4. An electronic camera according to claim 2, wherein the first arithmetic expression includes a process for subtracting a numerical value indicating the degree of focus of the area to be noticed by a normalization value of a numerical value indicating a brightness of the area to be noticed, and the second arithmetic expression includes a process for subtracting a numerical value indicating the degree of focus of the area to be noticed by a normalization value of a difference between the numeral value indicating the brightness of the area to be noticed and a numerical value indicating a brightness of the adjacent area.

5. An electronic camera according to claim 1, further comprising an excluder which excludes a first portion image having a luminance exceeding a third threshold value from a target to be noticed of said detector, out of the scene image generated by said imager.

6. An electronic camera according to claim 5, further comprising a controller which determines whether or not a second portion image having a luminance exceeding a fourth threshold value larger than the third threshold value exists on the scene image generated by said imager so as to start said excluder when a determination result is affirmative, and stopping said excluder when the determination result is negative.

7. An electronic camera according to claim 6, wherein said determiner renders the determination result affirmative when a ratio of the number of pixels having a luminance exceeding the fourth threshold value to the number of pixels forming the first portion image exceeds a reference.

8. An electronic camera according to claim 6, further comprising a pixel detector which detects, from the scene image generated by said imager, a number of specific pixels having a luminance exceeding the fourth threshold value, wherein said determiner executes a determining process based on the number of specific pixels detected by said pixel detector.

9. An electronic camera according to claim 8, wherein said pixel detector detects the specific pixels out of the first portion image.

10. An electronic camera according to claim 6, further comprising a decreasor which decreases the third threshold value according to an increase of area of the second portion image.

11. An electronic camera according to claim 5, wherein said detector integrates a high-frequency component of the partial image belonging to each of the plurality of areas to obtain the degree of focus, and said excluder prohibits an integral process of said detector corresponding to the first portion image.

12. An imaging control program recorded on a non-transitory recording medium in order to control an electronic camera comprising: an imager, having an imaging surface irradiated with an optical image of a scene through an optical lens, which repeatedly generates a scene image; an allocator which allocates a plurality of areas on the scene captured by said imaging surface; and a detector which detects a degree of focus of a partial image belonging to each of the plurality of areas allocated by said allocator, out of the scene image generated by said imager, the program causing a processor of the electronic camera to perform the steps, comprising:

a designating step of sequentially designating each of the plurality of areas allocated by said allocator as an area to be noticed;

a modifying step of modifying the degree of focus detected by said detecting step corresponding to the area to be noticed to a lower value, as a brightness of the partial image belonging to one or more areas including the area to be noticed is higher; and an adjusting step of adjusting a distance from said optical lens to said imaging surface to a distance corresponding to a focal point, with reference to the degree of focus modified by said modifying step.

13. An imaging control method executed by an electronic camera comprising: an imager, having an imaging surface irradiated with an optical image of a scene through an optical lens, which repeatedly generates a scene image; an allocator which allocates a plurality of areas on the scene captured by said imaging surface; and a detector which detects a degree of focus of a partial image belonging to each of the plurality of areas allocated by said allocator, out of the scene image generated by said imager, said imaging control method, comprising:

a designating step of sequentially designating each of the plurality of areas allocated by said allocator as an area to be noticed;

a modifying step of modifying the degree of focus detected by said detecting step corresponding to the area to be noticed to a lower value, as a brightness of the partial image belonging to one or more areas including the area to be noticed is higher; and an adjusting step of adjusting a distance from said optical lens to said imaging surface to a distance corresponding to a focal point, with reference to the degree of focus modified by said modifying step.

\* \* \* \* \*